United States Patent
Cong et al.

(10) Patent No.: US 11,650,098 B2
(45) Date of Patent: May 16, 2023

(54) METHOD AND DEVICE FOR MEASURING LIGHT RADIATION PRESSURE

(71) Applicants: Tsinghua University, Beijing (CN); HON HAI PRECISION INDUSTRY CO., LTD., New Taipei (TW)

(72) Inventors: Lin Cong, Beijing (CN); Zi Yuan, Shenzhen (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 375 days.

(21) Appl. No.: 17/147,767

(22) Filed: Jan. 13, 2021

(65) Prior Publication Data
US 2021/0223099 A1 Jul. 22, 2021

(30) Foreign Application Priority Data
Jan. 16, 2020 (CN) .......................... 202010048183.X (51) Int. Cl.
*G01J 1/56* (2006.01)
*G01J 1/04* (2006.01)
*C01B 32/158* (2017.01)

(52) U.S. Cl.
CPC .............. *G01J 1/56* (2013.01); *C01B 32/158* (2017.08); *G01J 1/04* (2013.01); *C01B 2202/06* (2013.01)

(58) Field of Classification Search
CPC ..... G01G 1/18; G01G 3/10; G01J 1/56; G01J 1/04; C01B 2202/06; C01B 32/158; G01N 2291/02872
USPC ........... 356/445–448, 213–218, 502; 73/705, 73/700; 250/461.1, 231.11, 227.14, 250/227.18
See application file for complete search history.

(56) References Cited

U.S. PATENT DOCUMENTS

| | | | |
|---|---|---|---|
| 6,976,395 B2 * | 12/2005 | Arndt | G01L 11/02 73/705 |
| 2013/0008248 A1 * | 1/2013 | Peng | G01V 7/10 73/383 |
| 2015/0346398 A1 | 12/2015 | Gorodetsky et al. | |
| 2021/0223091 A1 * | 7/2021 | Cong | G01G 3/10 |

FOREIGN PATENT DOCUMENTS

CN 107101760 8/2017

* cited by examiner

*Primary Examiner* — Hoa Q Pham
(74) *Attorney, Agent, or Firm* — ScienBiziP, P.C.

(57) ABSTRACT

A device for measuring a light radiation pressure is provided which includes a torsion balance, a laser, a convex lens, and a line array detector. The laser is configured to emit a first laser beam. The convex lens is located on an optical path of the first laser beam and configured to focus the first laser beam to a surface of the reflector. The line array detector is configured to detect a reflected first laser beam reflected by the reflector. The disclosure also provides a method for measuring the light radiation pressure using the device.

17 Claims, 7 Drawing Sheets

METHOD AND DEVICE FOR MEASURING LIGHT RADIATION PRESSURE

CROSS-REFERENCE TO RELATED APPLICATIONS

This application is related to commonly-assigned application entitled, "TORSION BALANCE AND METHOD FOR MAKING THE SAME", concurrently filed Ser. No. 17/147,769. The entire contents of which are incorporated herein by reference.

FIELD

The present application relates to the field of precision instruments, and in particular, to a device and a method for measuring light radiation pressure.

BACKGROUND

The measurement of light radiation pressure is particularly important, but the magnitude of the light radiation pressure is quite small, and it is difficult to measure it with ordinary force measuring devices. At present, the main methods for measuring the light radiation pressure are mostly improved on the basis of Lebedev's experimental device. Under the action of light radiation pressure, the existing torsion balance is twisted, and the light radiation pressure is derived by measuring the rotation angle. The light radiation pressure can be direct measured by the pressure observer (pressure ceramic). The method for measuring the light radiation pressure by the pressure observer (pressure ceramic) includes the following steps: the pressure is applied to a measuring instrument, the electric signal of the measuring instrument is changed accordingly; and the electric signal is amplified, and the relationship between the voltage and the measured pressure is finally obtained. However, the accuracy and sensitivity of the above-mentioned device and method are quite low, and they are not suitable for measuring light radiation pressure.

Therefore, there is room for improvement in the art.

BRIEF DESCRIPTION OF THE DRAWINGS

Implementations of the present technology will now be described, by way of embodiments, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to be better illustrate details and features. The description is not to be considered as limiting the scope of the embodiments described herein.

Several definitions that apply throughout this disclosure will now be presented.

The term "substantially" is defined to be essentially conforming to the particular dimension, shape or another word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
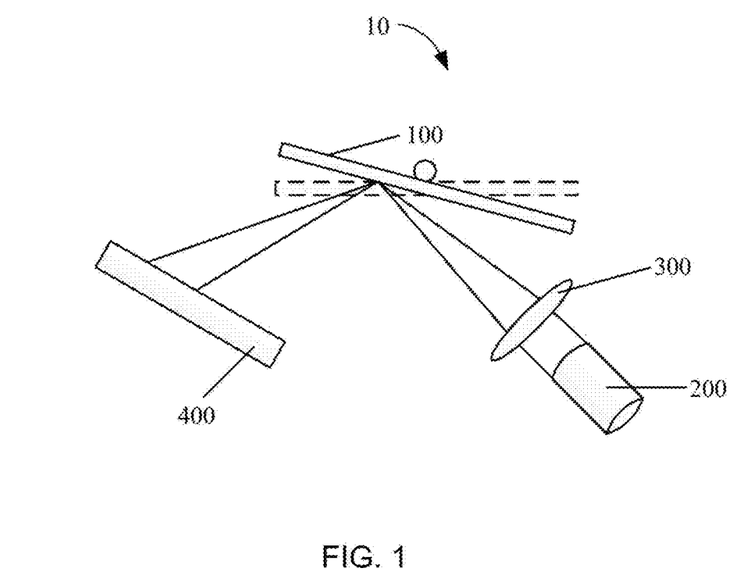
FIG. 1 is a structural schematic view of a device for measuring light radiation pressure according to one embodiment of the present disclosure.

FIG. 1 shows an embodiment of a device 10 for measuring light radiation pressure. The device 10 includes a torsion balance 100, a laser 200, a convex lens 300, and a line array detector 400. The laser 200 is used to emit a first laser beam, and the first laser beam is focused by the convex lens 300 to form a focused first laser beam. The focused first laser beam irradiates the torsion balance 100, and then is reflected by the torsion balance 100 to form a reflected first laser beam. The line array detector 400 is used to receive the reflected first laser beam.

Figure 2:
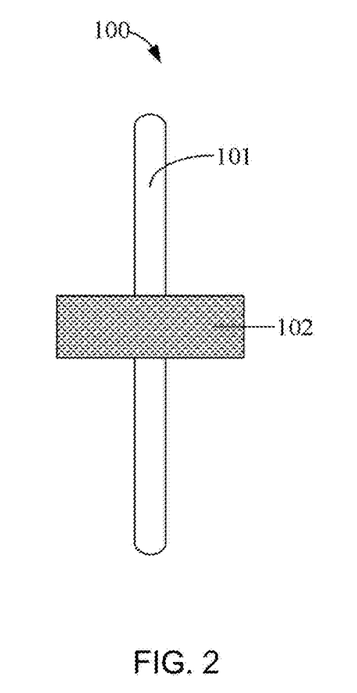
FIG. 2 is a front structural schematic view of a torsion balance according to one embodiment of the present disclosure.
Figure 3:
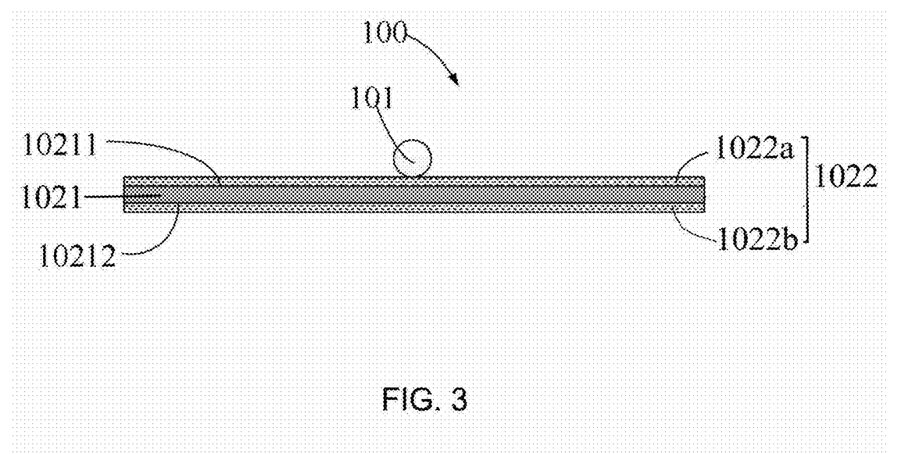
FIG. 3 is a top structural schematic view of a torsion balance according to one embodiment of the present disclosure.

Referring to FIG. 2 and FIG. 3, the torsion balance 100 includes a suspended carbon nanotube 101 and a reflector 102 hung on the carbon nanotube 101. The reflector 102 includes a film 1021, a first reflecting layer 1022a, and a second reflecting layer 1022b. The film 1021 includes at least two layers of two-dimensional materials stacked with each other. The film 1021 has a first surface 10211 and a second surface 10212 opposite to the first surface 10211. The first reflecting layer 1022a is located on the first surface 10211, and the second reflecting layer 1022b is located on the second surface 10212.

The carbon nanotube 101 can be selected from a single-walled carbon nanotube or a multi-walled carbon nanotube, or the carbon nanotube 101 can be prepared by removing the outer wall of a multi-walled carbon nanotube, so that the outer surface of the carbon nanotube can be super clean, which can facilitate the suspension and fixation of the reflector 102 onto the surface of the carbon nanotube 101. The diameter of the carbon nanotube 101 is not limited. The smaller the diameter of the carbon nanotube 101, the higher the sensitivity and accuracy of the torsion balance 100. In one embodiment, the diameter of the carbon nanotube 101 is less than 10 nanometers. The suspended length of the carbon nanotube 101 is not limited. The longer the suspended lengths of the carbon nanotube 101, the higher the accuracy of the torsion balance 100. In one embodiment, the carbon nanotube 101 is a single-walled carbon nanotube with a diameter of about 7 nanometers and a suspended length of about 300 micrometers. Since the diameter of a single carbon nanotube is in nanometer scale, using the single carbon nanotube as a twisting wire of the torsion balance 100 can improve the sensitivity and accuracy of the torsion balance 100.

The film 1021 can be a "free-standing" film. The term "free-standing" includes, but is not limited to, a structure that does not have to be supported by a substrate and can sustain the weight of itself when it is hoisted by a portion thereof without any significant damage to its structural integrity. A shape of the film 1021 is not limited, specifically, it can be regular or irregular shape, such as rectangle, circle, or triangle. The film 1021 can be an axisymmetric shaped film, and the carbon nanotube 101 is located on the symmetry axis of the film 1021. In one embodiment, the film 1021 is a rectangle shaped film with a width of about 80 μm and a length of about 120 μm.

The film 1021 includes at least two layers of two-dimensional materials stacked one after another. The two-dimensional material layer has a continuous surface with a certain area. The two-dimensional material can be carbon nanotube film, graphene, boron nitride, molybdenum disulfide, tungsten disulfide or any combination thereof. The types of the two-dimensional materials in the film 1021 can be the same or different. On one hand, increasing the thickness of the first reflecting layer 1022a and/or the second reflecting layer 1022b can make the surface of the reflector 102 flat and then increase the reflectivity of the incident light, especially when the film 1021 only includes carbon nanotube films and the carbon nanotube films include a plurality of micropores. On the other hand, the increase in the thickness of the first reflecting layer 1022a and/or the second reflecting layer 1022b will inevitably reduce the sensitivity and accuracy of the torsion balance 100.

In one embodiment, the carbon nanotube film coexists with other two-dimensional materials, such as graphene, boron nitride, molybdenum disulfide, or tungsten disulfide, and serves as a supporter for the other two-dimensional materials.

The carbon nanotube film includes a plurality of carbon nanotubes combined by van der Waals attractive force therebetween. The carbon nanotubes in the carbon nanotube film can be orderly aligned or disorderly aligned. The disorderly aligned carbon nanotubes are carbon nanotubes arranged along many different directions, such that the number of carbon nanotubes arranged along each different direction can be almost the same (e.g. uniformly disordered); and/or entangled with each other. The orderly aligned carbon nanotubes are carbon nanotubes arranged in a consistently systematic manner, e.g., most of the carbon nanotubes are arranged approximately along a same direction or have two or more sections within each of which the most of the carbon nanotubes are arranged approximately along a same direction (different sections can have different directions). The carbon nanotube film can be a drawn carbon nanotube film, a flocculated carbon nanotube film, or a pressed carbon nanotube film.

In one embodiment, the carbon nanotube layer includes at least one drawn carbon nanotube film. A film can be drawn from a carbon nanotube array, to form a drawn carbon nanotube film. The drawn carbon nanotube film includes a plurality of successive and oriented carbon nanotubes joined end-to-end by van der Waals attractive force therebetween. A plurality of carbon nanotubes in the drawn carbon nanotube film are arranged substantially parallel to a surface of the drawn carbon nanotube film. The drawn carbon nanotube film is a free-standing film. Each drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and combined by van der Waals attractive force therebetween. When the film 1021 includes a plurality of drawn carbon nanotube films stacked one after another, an angle between the aligned directions of the carbon nanotubes in at least two drawn carbon nanotube films can be in a range from about 0 degrees to about 90 degrees.

In another embodiment, the carbon nanotube layer can include at least one pressed carbon nanotube film. The pressed carbon nanotube film can be a free-standing carbon nanotube film. The carbon nanotubes in the pressed carbon nanotube film can be substantially arranged along a same direction or substantially arranged along different directions. The carbon nanotubes in the pressed carbon nanotube film can rest upon each other. Adjacent carbon nanotubes are attracted to each other and combined by van der Waals attractive force. The pressed carbon nanotube film has excellent durability, and can be fashioned into desired shapes with a low risk to the integrity of the pressed carbon nanotube film. An angle between a primary alignment direction of the carbon nanotubes and a surface of the pressed carbon nanotube film is in a range from about 0 degrees to about 15 degrees. The greater the pressure applied, the smaller the angle formed. When the carbon nanotubes in the pressed carbon nanotube film are substantially arranged along different directions, the carbon nanotube structure can be isotropic. When pressed in different directions, the carbon nanotubes are arranged in preferred orientations in different directions. When pressed in the same direction, the carbon nanotubes are arranged in a preferred orientation along a fixed direction. In addition, when the pressing direction is perpendicular to the surface of the carbon nanotube array, the carbon nanotubes can be arranged in disorder.

The area of the pressed carbon nanotube film can be basically the same as the area of the carbon nanotube array. The thickness of the pressed carbon nanotube film is related to the height of the carbon nanotube array and the pressure. It can be understood that the greater the height of the carbon nanotube array, the greater the thickness of the pressed carbon nanotube film; and the smaller the pressure applied, the greater the thickness of the pressed carbon nanotube film.

In another embodiment, the carbon nanotube layer can include at least one flocculated carbon nanotube film formed by a flocculating method. The flocculated carbon nanotube film can include a plurality of long, curved, disordered carbon nanotubes entangled with each other. The length of the carbon nanotube can be greater than 10 micrometers. The carbon nanotubes can be randomly arranged and curved in the flocculated carbon nanotube film. The carbon nanotubes can be substantially uniformly distributed in the flocculated carbon nanotube film. The adjacent carbon nanotubes are acted upon by the van der Waals attractive force therebetween, thereby forming an entangled structure with micropores defined therein. The size of the micropores can be less than 10 micrometers. Due to the carbon nanotubes in the flocculated carbon nanotube film being entangled with each other, the flocculated carbon nanotube film has excellent durability, and can be fashioned into desired shapes with a low risk to the integrity of flocculated carbon nanotube film. The flocculated carbon nanotube film can be a free-standing structure due to the carbon nanotubes being entangled and adhered together by van der Waals attractive force therebetween.

Since the thickness of the single-layer two-dimensional materials is very thin, the thickness of the film 1021 can be greatly reduced, and accordingly the thickness of the reflector 102 of the torsion balance 100 can be reduced, thereby improving the sensitivity and accuracy of the torsion balance 100.

Increasing the number of layers of the two-dimensional material may increase the mass and thickness of the reflector 102, resulting in a larger moment of inertia of the reflector 102, which is unhelpful for improving the sensitivity and accuracy of the torsion balance 100. In addition, the reflector 102 is not easy to be fixed and suspended on the carbon nanotube 101 and may cause the twisting wire of the carbon nanotube 101 to break when there are too many layers of two-dimensional materials. Therefore, the number of layers of the two-dimensional material should not be too many, which can be greater than 2 and less than 10. In one embodiment, the number is greater than 2 and less than 5.

The film 1021 can be a carbon nanotube-graphene composite film, which includes a first drawn carbon nanotube film, a second drawn carbon nanotube film, and a single layered graphene film sandwiched between the first drawn carbon nanotube film and the second drawn carbon nanotube film. An angle between the extending direction of the carbon nanotubes in the first drawn carbon nanotube film and the extending direction of the carbon nanotubes in the second drawn carbon nanotube film can be about 90 degrees. The single layered graphene film is a two-dimensional planar hexagonal dense array structure composed of sp2 hybridized carbon atoms. The single layered graphene film can be prepared by mechanical exfoliation or chemical vapor deposition (CVD). The first drawn carbon nanotube film, the second drawn carbon nanotube film, and the single layered graphene film can be overlapped each other. The term 'overlap' means that when the graphene film is disposed on a surface of the carbon nanotube film, the graphene film can completely cover the carbon nanotube film; and when the carbon nanotube film is disposed on a surface of the graphene film, the carbon nanotube film can completely cover the graphene film as well. Additionally, the carbon atoms of the single layered graphene film can be $sp^3$ hybridized to the carbon atoms of the drawn carbon nanotube film, so that the graphene film is stably fixed to the surface of the carbon nanotube film.

The film 1021 can be selected from carbon nanotubes, graphene or other two-dimensional materials. The torque can be improved by selecting a film 1021 with low density, light weight, and a large surface area, then the sensitivity and accuracy of the torsion balance 100 is improved, so that the torsion balance 100 can be used for measuring micro-force and micro-torque.

The first reflecting layer 1022a is located on the first surface 10211 of the film 1021, and the second reflecting layer 1022b is located on the second surface 10212 of the film 1021. The first reflecting layer 1022a and the second reflecting layer 1022b can be formed by evaporation, sputtering, or the like. The first reflecting layer 1022a and the second reflecting layer 1022b form a reflecting layer 1022. If the reflecting layer 1022 is only formed on one surface of the film 1021, the film 1021 may tend to curl after the reflecting layer 1022 is formed. Therefore, it is necessary to form reflecting layers 1022 on both the first surface 10211 and the second surface 10212.

The first reflecting layer 1022a and the second reflecting layer 1022b can be made of a material having small density and high reflectivity. Specifically, the material of the first reflecting layer 1022a and the second reflecting layer 1022b is metal material, such as aluminum, silver, copper, chromium, platinum, or the like. The metal material can be formed on the surface of the film 1021 by a chemical method such as chemical vapor deposition (CVD), or by a physical method such as vacuum evaporation or magnetron sputtering.

The thickness of the first reflecting layer 1022a and the second reflecting layer 1022b should not be too small or too large. If the thicknesses of the first reflecting layer 1022a and the second reflecting layer 1022b is too small, the reflectivity of the incident laser beam at the reflector 102 will decreases; however, if the thickness of the first reflecting layer 1022a and the second reflecting layer 1022b is too large, the mess of the reflector 102 increases and the sensitivity of the torsion balance 100 decreases. Specifically, the thickness of the first reflecting layer 1022a can be in a range of 5 nm to 20 nm, and the thickness of the second reflecting layer 1022b can be in a range of 5 nm to 20 nm. In one embodiment, both the first reflecting layer 1022a and the second reflecting layer 1022b are aluminum layers with a thickness of about 10 nm.

In one embodiment, the reflecting layer has a smooth surface at molecular level, with which the deflection angle of the film 1021 can be accurately determined, thereby improving the sensitivity and accuracy of the torsion balance 100. The molecular level surface can be achieved by controlling the forming conditions of the reflecting layer.

The film 1021 can be directly contacted with the carbon nanotube 101, or the film 1021 can be contacted with the carbon nanotube 101 through the reflecting layer between the film 1021 and the carbon nanotube 101.

It can be understood that in the process of preparing the torsion balance 100, the thin film 1021 can be firstly fixed to the carbon nanotube 101, and then the reflecting layers are formed on the surface of the thin film 1021. In this method, the carbon nanotube 101 is directly contacted with the film 1021, so that the reflecting layer can coat and fix the carbon nanotube 101 and the film 1021 together. Alternatively, the reflecting layer 1022 can also be formed on the surface of the film 1021 first, and then the film 1021 is suspended and fixed on the carbon nanotube 101, so that the single carbon nanotube 101 is directly contacted with the reflecting layer.

Figure 4:
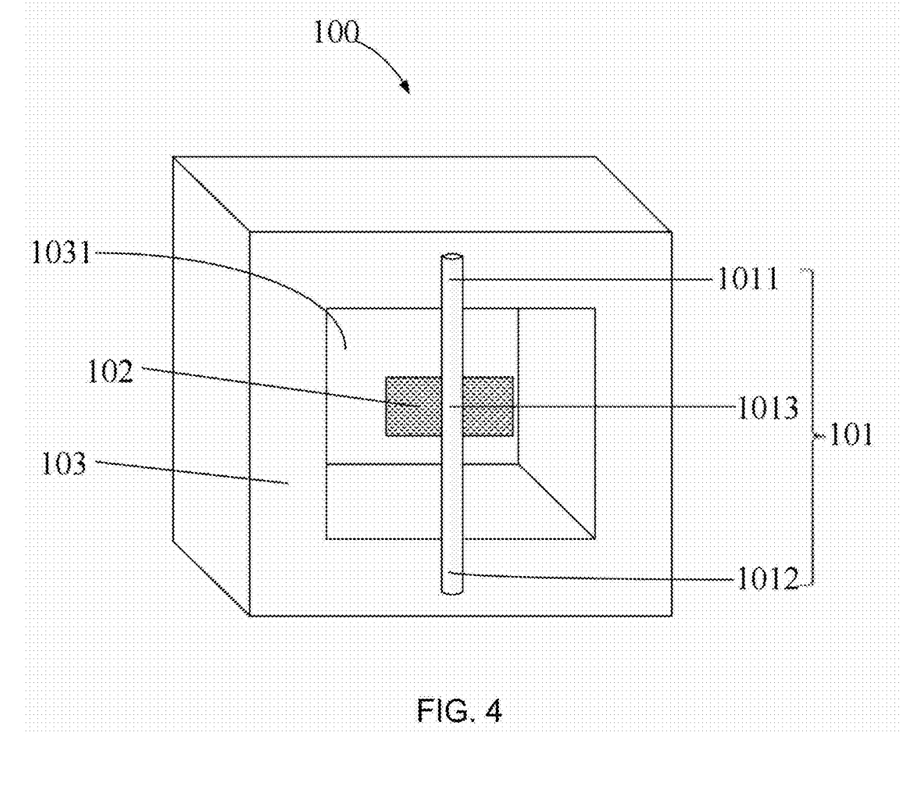
FIG. 4 is a three-dimensional structural schematic view of a torsion balance according to one embodiment of the present disclosure.

Referring to FIG. 4, the torsion balance 100 can further include a substrate 103 as a fixing element for fixing and supporting the carbon nanotube 101. A space 1031 is defined on a surface of the substrate 103, and the single carbon nanotube 101 can be arranged across the space 1031.

Specifically, the carbon nanotube 101 includes a first end 1011, a second end 1012 opposite to the first end 1011, and a middle portion 1013 located between the first end 1011 and the second end 1012. The first end 1011 and the second end 1012 respectively contact with the surface of the substrate 103 and are fixed on the surface of the substrate 103. The middle portion 1013 of the carbon nanotube 101 is suspended on the space 1031, and the film 1021 hung on the surface of the suspended carbon nanotube.

The material and size of the substrate 103 are not limited and can be selected according to practical application.

The space 1031 should have a certain depth and a certain width, so as to provide sufficient space for the rotation of the film 1021 when the film 1021 rotates around the carbon nanotube 101 under a micro force. The size of the space 1031 is not limited and can be selected according to practical applications. Specifically, the space 1031 can be a through hole or a blind hole. The shape of the through hole or the blind hole is not limited, and it can be a regular hole or an irregular hole, for example, a circular hole, a square hole, or so on.

The film 1021 is fixed on the surface of the carbon nanotube 101. The position of the film 1021 is not limited to the space 1031. For example, the film 1021 can be located inside the space 1031 or outside the space 1031.

In one embodiment, the space 1031 is a through hole formed on the surface of the substrate 103, and the through hole is a square hole with two side lengths of 300 μm.

Figure 5:
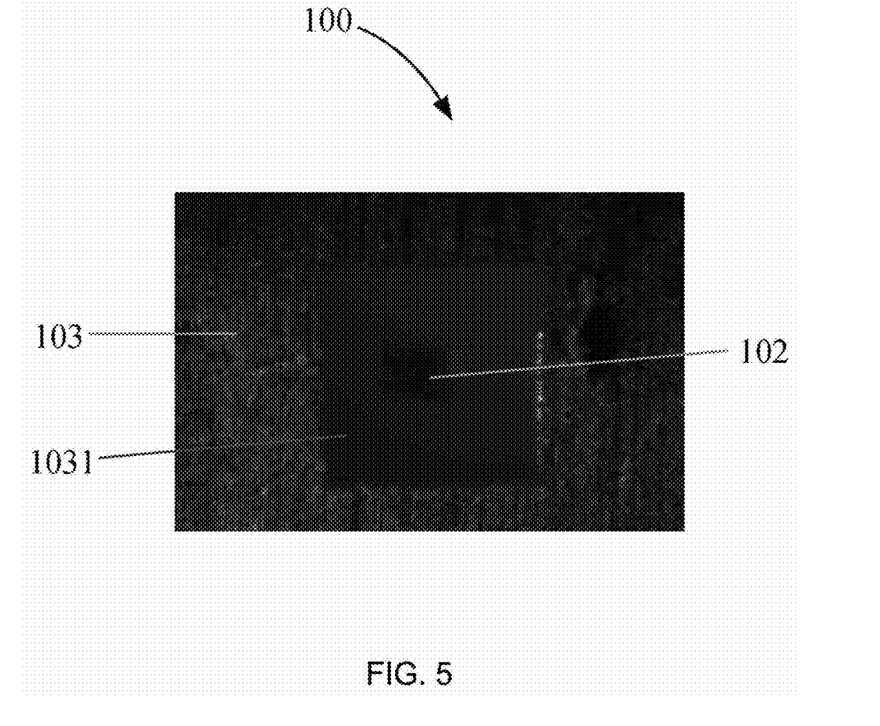
FIG. 5 is an optical microscope photo of the torsion balance according to one embodiment of the present disclosure

FIG. 5 is an optical microscope photo of the torsion balance 100 in one embodiment of the present disclosure. Since the diameter of the carbon nanotubes is about 7 nanometers, the carbon nanotubes cannot be shown in FIG. 5.

The working principle of the torsion balance 100 is as follows:

providing a laser beam emitted to the surface of the reflector, the laser beam is reflected at the reflector and received by the detector at a first position;

applying a micro force to the surface of the reflector to deflect the reflector, the laser beam is received by the detector at a second position; and calculating the magnitude of the micro force according to the first position and the second position.

It can be seen that the value of the micro force is calculated based on the position of the reflected light spot before deflecting the reflector and the position of the reflected light spot after deflecting the reflector.

The laser 200 is used to emit a first laser beam. The type of the laser 200 is not limited any device capable of emitting laser beam can be used in this disclosure.

The convex lens 300 is located on an optical path of the first laser beam and is used to focus the first laser beam to the surface of the reflector 102. The type of the convex lens 300 is not limited, any lens with focusing function can be used in this disclosure.

The line array detector 400 is configured to receive the reflected light of the reflector 102 and detect the position of light received reflected light spot. The line array detector 400 is located on the optical path of reflected light.

Figure 6:
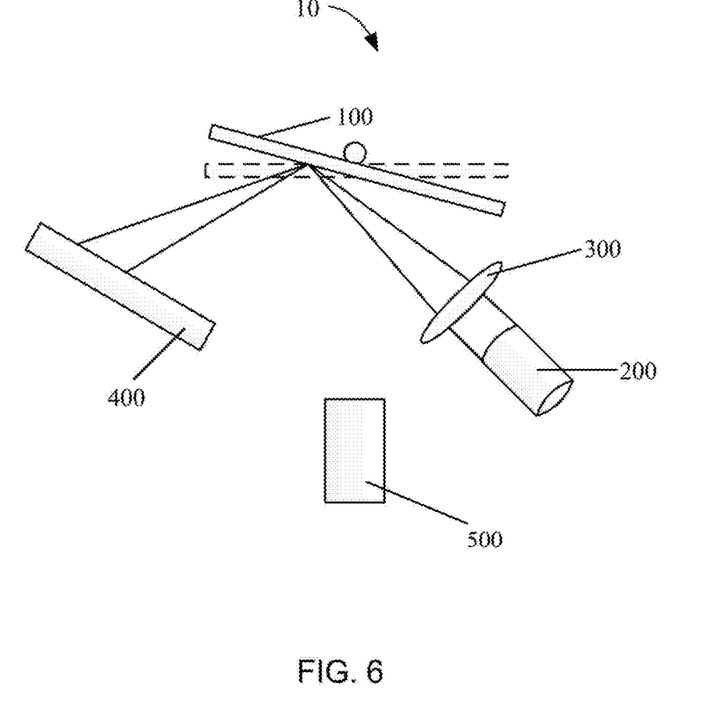
FIG. 6 is a structural schematic view of a device for measuring light radiation pressure according to another embodiment of the present disclosure.

Referring to FIG. 6, the device 10 can further include an optical microscope 500 for observing the torsion balance 100. The optical microscope 500 can be used to observe whether the reflector 102 of the torsion balance 100 is deflected, and to observe and measure the length of the arm of the reflector 102 under a micro force, which is convenient for calculating the light radiation pressure. The position of the optical microscope 500 is not limited, as long as the torsion balance 100 can be observed by the optical microscope 500. In one embodiment, the optical microscope 500 is set opposite to the torsion balance 100, and the center point of the torsion balance 100 is on the axis of the optical microscope 500.

Figure 7:
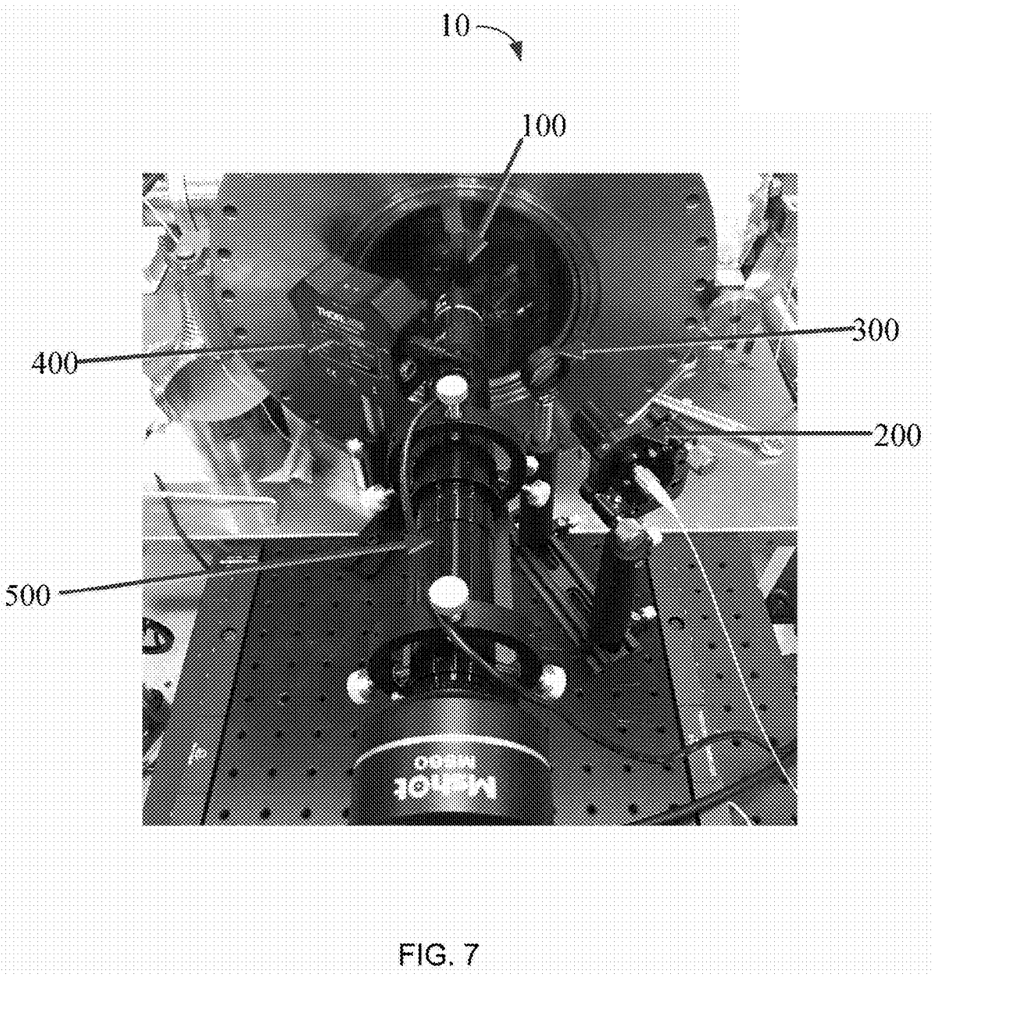
FIG. 7 is a schematic photo of a device for measuring light radiation pressure according to one embodiment.

FIG. 7 is a schematic photo of the device for measuring light radiation pressure according to one embodiment. The torsion balance 100 can be placed in a vacuum chamber, which can avoid the influence of the fluctuation of the external air flow on the light radiation pressure. The vacuum chamber includes a quartz window, the light passing through the convex lens 300. The light from the convex lens 300 passes through the quartz window and then enters the surface of the reflector 102. It should be noted the torsion balance 100 cannot be clearly shown in FIG. 7 because the torsion balance 100 is only in micrometer scale.

A method for measuring light radiation pressure using the device 10 is provided according to one embodiment. The method includes, at least the following blocks:

S1, emitting a first laser beam by the laser 200, wherein the light radiation pressure of the first laser beam is known and defined as F1, the first laser beam is focused by the convex lens 300 and then irradiates to a surface of the reflector 102, the reflector 102 is deflected under the first laser beam, and the first laser beam is reflected at the reflector 102 to form a first reflected beam, and the first reflected beam is received by the line array detector 400 at a first position x1;

S2, emitting a second laser beam by the laser 200, wherein the light radiation pressure of the second laser beam is unknown and defined as F2, the second laser beam is focused by the convex lens 300 and then irradiates to the surface of the reflector 102, the reflector 102 is deflected under the second laser beam, and the second laser beam is reflected at the reflector 102 to form a second reflected beam, and the second reflected beam is received by the line array detector 400 at a second position x2;

S3, calculating the deflection angle Δθ between the second reflected beam and the first reflected beam according to the first position x1 and the second position x2:

$$\Delta\theta = \frac{x_2 - x_1}{D},$$

wherein D is the distance from the reflector 102 to the line array detector 400;

S4, calculating the light radiation pressure of the second laser beam F2 according to the torsion Hooke's law: $K \times \Delta\alpha = \Delta F \times L$, wherein κ is the torsional stiffness of the carbon nanotube 101; Δα is the angle of the second deflection of the reflector 102 compared to the first deflection of the reflector 102, $$\Delta\alpha = \frac{\Delta\theta}{2};$$

ΔF is the light radiation pressure difference between the second laser beam and the first laser beam, $\Delta F = F_2 - F_1$; and L is the length of the arm.

In the step S1, the position of the spot of the first reflected beam is received and recorded as x1 by the line array detector 400. The reflector 102 twists and swings slightly around an balance position at a natural frequency when the first laser beam irradiates the reflector 102, and the spot of the first reflected beam moves back and forth around the first position x1 on the line array detector 400. In one embodiment, the line array detector 400 continuously acquires a plurality of data at intervals of 1 millisecond (ms), and then calculates the average value of these data to obtain the first position x1

In the step S2, the position of the spot of the second reflected beam is received and recorded as x2 by the line array detector 400. The method of obtaining the second position x2 can be the same as the method in the step S1.

In the step S3, the deflection angle $\Delta\theta$ is in radians.

In the step S4, the length of the arm L can be measured by imaging software of the optical microscope 500 in a computer.

The torsional stiffness $\kappa$ of the carbon nanotube 101 can be calculated by the following formula:

$$\kappa = I \times \omega^2,$$

Wherein I is the moment of inertia of the torsion balance 100, assuming that the length of the reflector 102 is a, the width of the reflector 102 is b, the thickness of the reflector 102 is h, and the density of the reflecting layer is p, then the moment of inertia is $$I = \frac{\rho h b a^3}{12}.$$

Wherein $\omega$ is the natural frequency of swing of the carbon nanotube 101. The carbon nanotube 101 and the reflector 102 swing at the same natural frequency. The reflector 102 twists and swings slightly around the balance position at the natural frequency when the first laser beam irradiates the reflector 102, and the spot of the first reflected beam moves back and forth around the first position x1 on the line array detector 400 at the same natural frequency. The line array detector 400 can continuously acquire a plurality of data at intervals of 1 ms, then the relationship between the position of the center of the spot of the first reflected beam and time can be obtained, and then the natural frequency $\omega$ can be obtained by Fourier transform.

Furthermore, in order to reduce the measurement error, the balance position of the reflector 102 can be changed by changing the power of the laser 200, and the natural frequency $\omega$ can be measured several times at different balance positions to obtain an average torsional stiffness $\kappa$.

If the torsional stiffness $\kappa$, the angle $\Delta\alpha$, and the arm length L are known, the light radiation pressure difference between the second laser beam and the first laser beam $\Delta F$ can be easily calculated, and then the light radiation pressure of the second laser beam can be calculated.

Figure 8:
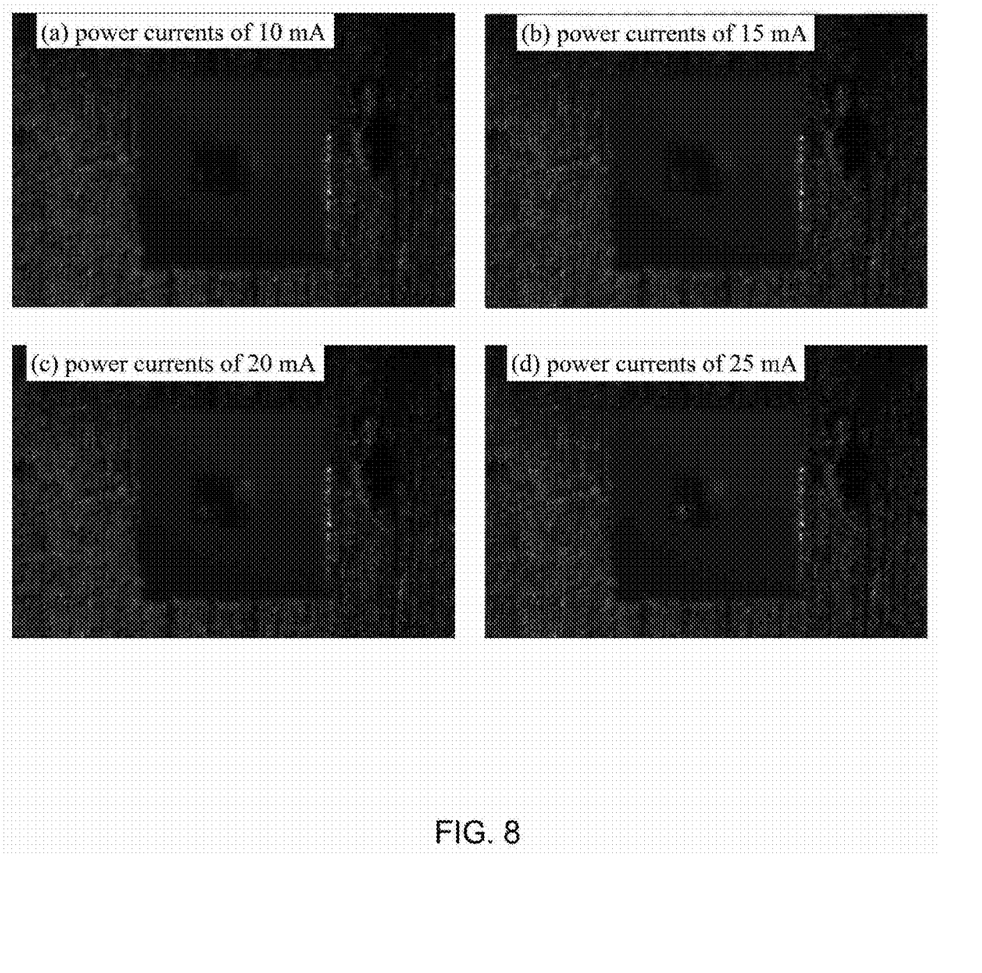
FIG. 8 is an optical microscope photograph of the torsion balance under laser beams with power currents of 10 mA, 15 mA, 20 mA, and 25 mA.

In one embodiment, laser beams with power currents of 10 mA, 15 mA, 20 mA, and 25 mA are used to irradiate the reflector 102, respectively. Photos obtained by an optical microscope are shown in FIG. 8. The reflector 102 is deflected under laser irradiation, and the greater the power of the laser, the greater the deflection angle of the reflector 102, as shown in FIG. 8. It can be seen that the torsion balance 100 used in this embodiment can respond to the light radiation pressure and twist under the light radiation pressure.

In another embodiment, the power currents of the laser beams are reduced to nanoampere (nA) level. Specifically, laser beams with power currents of 41 nA, 42 nA, 43 nA, 44 nA, 45 nA, 46 nA, 47 nA, 48 nA, 49 nA, and 50 nA are used to irradiate the reflector 102 respectively. The laser power, the light radiation pressure obtained by laser power, the position of the reflected spot, the theoretical deflection angle, and the actual deflection angle are shown in the following table:

| Current (nA) | Position (pixel) | Laser power (µW) | Light radiation pressure (fN) | Theoretical deflection angle (rad) | Actual deflection angle (rad) |
| --- | --- | --- | --- | --- | --- |
| 41 | 849.2021 | 2.67 | 12.5846 | 3.825106383 | 0.084920206 |
| 42 | 851.3485 | 2.84 | 13.38587 | 4.068652482 | 0.085134845 |
| 43 | 856.7464 | 3.05 | 14.37567 | 4.369503546 | 0.085674639 |
| 44 | 872.9938 | 3.23 | 15.22407 | 4.627375887 | 0.087299381 |
| 45 | 930.9918 | 3.46 | 16.30813 | 4.956879433 | 0.093099175 |
| 46 | 917.3897 | 3.72 | 17.5336 | 5.329361702 | 0.091738969 |
| 47 | 946.9196 | 3.96 | 18.6648 | 5.673191489 | 0.094691959 |
| 48 | 970.5031 | 4.26 | 20.0788 | 6.102978723 | 0.097050309 |
| 49 | 1002.944 | 4.53 | 21.3514 | 6.489787234 | 0.100294433 |
| 50 | 1059.544 | 4.86 | 22.9068 | 6.962553191 | 0.105954433 |

It can be seen from the above table that the actual deflection angle of the reflector 102 is much smaller than the theoretical deflection angle, which is mainly due to various losses in actual operation, such as the reflection of light by the quartz window of the vacuum cavity, the reflectivity of the surface of the mirror 102 is relatively small, and so on. In actual operation, the light radiation pressure received by the reflector 102 is much smaller than the theoretical light radiation pressure calculated in the above table, indicating that the device 10 is also sensitive to forces that are two orders of magnitude smaller than fN.

Figure 9:
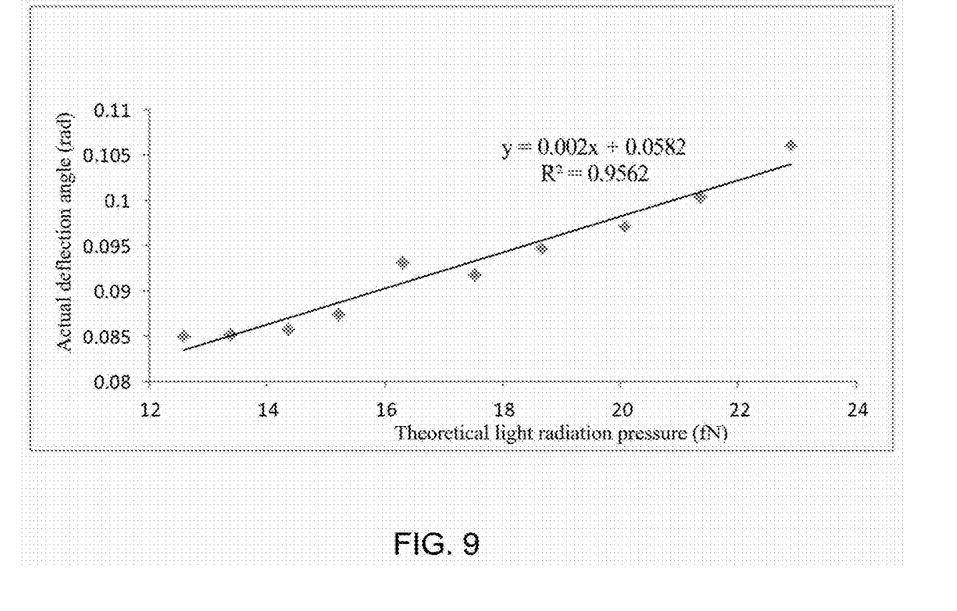
FIG. 9 is a graph of the actual deflection angle of the reflector varying with the power current.

Referring to FIG. 9, the actual deflection angle of the reflector 102 is linearly related to the theoretical light radiation pressure, and the regression sum of squares R2 is close to 1.

It is also possible to use multiple laser beams with known power to irradiate the reflector 102, then the line array detector 400 can obtain multiple deflection angles, and then obtain the relationship between the actual deflection angle and the theoretical light radiation pressure. Thereafter, when the reflector 102 is irradiated with laser beams with known power, the light radiation pressure with unknown power can be obtained according the actual deflection angle of the reflector 102 and the relationship between the actual deflection angle and the theoretical light radiation pressure.

The single carbon nanotube has a nanosized diameter, and the two-dimensional nanomaterial is light in weight and large in surface area, so the two-dimensional nanomaterial has a small moment of inertia. The present disclosure uses a single carbon nanotube as the twisting wire of the torsion balance and uses two-dimensional nanomaterials as the reflector of the torsion balance, which can make the torsion balance have extremely high sensitivity and accuracy, so that device using the torsion balance can realize fN-level light radiation pressure resolution, and can even achieve light radiation pressure resolution two orders of magnitude smaller than fN.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A device for measuring a light radiation pressure, comprising:
    a laser configured to emit a first laser beam;
    a convex lens located on an optical path of the first laser beam and configured to focus the first laser beam to a surface of the reflector;
    a torsion balance comprising a suspended carbon nanotube and a reflector hung on the carbon nanotube; wherein the reflector is configured to reflect a focused first laser beam; the reflector comprises a film, a first reflecting layer, and a second reflecting layer; and the film comprises at least two layers of two-dimensional materials stacked with each other, the film comprises a first surface and a second surface opposite to the first surface, and the first reflecting layer is located on the first surface and the second reflecting layer is located on the second surface; and
    a line array detector configured to detect a reflected first laser beam reflected by the reflector.

2. The device of claim 1, wherein the at least two layers of two-dimensional material is carbon nanotube film, graphene, boron nitride, molybdenum disulfide, tungsten disulfide or any combination thereof.

3. The device of claim 2, wherein the carbon nanotube film comprises a plurality of first carbon nanotubes combined by van der Waals attractive force therebetween.

4. The device of claim 2, wherein a number of layers of the two-dimensional material is less than 10.

5. The device of claim 1, wherein the film is a carbon nanotube-graphene composite film comprising a first drawn carbon nanotube film, a second drawn carbon nanotube film, and a single layered graphene film sandwiched between the first drawn carbon nanotube film and the second drawn carbon nanotube film.

6. The device of claim 5, wherein the first drawn carbon nanotube film comprises a plurality of first carbon nanotubes, and the second drawn carbon nanotube film comprises a plurality of second carbon nanotubes, an angle between an extending direction of the first carbon nanotubes and an extending direction of the second carbon nanotubes is about 90 degrees.

7. The device of claim 5, wherein carbon atoms of the single layered graphene film is $sp^3$ hybridized to carbon atoms of the first drawn carbon nanotube film.

8. The device of claim 1, wherein a material of the first reflecting layer is aluminum, silver, copper, chromium, platinum, or any combination thereof.

9. The device of claim 1, wherein a thickness of the first reflecting layer is in a range from about 5 nm to about 20 nm.

10. The device of claim 1, wherein the film is an axisymmetric shaped film, and the carbon nanotube is located on a symmetry axis of the film.

11. The device of claim 1, wherein the carbon nanotube is prepared by removing an outer wall of a multi-walled carbon nanotube.

12. The device of claim 1, further comprising a substrate configured to fix and support the carbon nanotube, wherein a space is formed on a surface of the substrate, and the carbon nanotube is arranged across the space.

13. The device of claim 12, wherein the carbon nanotube comprises a first end, a second end opposite to the first end, and a middle portion located between the first end and the second end; the first end and the second end are fixed on a surface of the substrate, the middle portion is suspended on the space.

14. The device of claim 12, wherein the space is a through hole or a blind hole.

15. The device of claim 1, further comprising an optical microscope configured to observe the torsion balance.

16. A method for measuring a light radiation pressure using the device of claim 1, comprising:
    S1, emitting a first laser beam using the laser, wherein a light radiation pressure of the first laser beam is known and defined as F1, the first laser beam is focused by the convex lens and then irradiates to a surface of the reflector, the reflector is deflected under the first laser beam, and the first laser beam is reflected at the reflector to form a first reflected beam, the first reflected beam is received by the line array detector at a first position x1;
    S2, emitting a second laser beam using the laser, wherein a light radiation pressure of the second laser beam is unknown and defined as F2, the second laser beam is focused by the convex lens and then irradiates to the surface of the reflector, the reflector is deflected under the second laser beam, and the second laser beam is reflected at the reflector to form a second reflected beam, the second reflected beam is received by the line array detector at a second position x2;
    S3, calculating a deflection angle $\Delta\theta$ between the second reflected beam and the first reflected beam according to the first position x1 and the second position x2:

$$\Delta\theta = \frac{x_2 - x_1}{D},$$

wherein D is a distance from the reflector to the line array detector; and
    S4, calculating F2 according to a torsion Hooke's law: $\kappa \times \Delta\alpha = \Delta F \times L$, wherein $\kappa$ is a torsional stiffness of the carbon nanotube;

$$\Delta\alpha = \frac{\Delta\theta}{2};$$

$\Delta F = F_2 - F_1$; L is a length of an arm.

17. The method of claim 16, wherein the line array detector is configured to acquire a plurality of data at intervals of 1 millisecond, and then calculate an average value as the first position x1.

* * * * *